Patented Nov. 11, 1924.

1,515,495

UNITED STATES PATENT OFFICE.

WILHELM KOLLE, HUGO BAUER, AND ERNST MASCHMANN, OF FRANKFORT-ON-THE-MAIN, GERMANY, ASSIGNORS TO FARBWERKE VORM. MEISTER LUCIUS & BRÜNING, OF HOCHST-ON-THE-MAIN, GERMANY, A CORPORATION OF GERMANY.

PROCESS OF PREPARING MERCURY SALTS OF COMPLEX ORGANIC BISMUTH ACIDS AND THE PRODUCTS OBTAINABLE THEREFROM.

No Drawing.    Application filed January 23, 1923.   Serial No. 614,470.

*To all whom it may concern:*

Be it known that we, WILHELM KOLLE, HUGO BAUER, and ERNST MASCHMANN, citizens of Germany, residing at Frankfort-on-the-Main, Germany, have invented certain new and useful Improvements in Processes of Preparing Mercury Salts of Complex Organic Bismuth Acids and the Products Obtainable Therefrom, of which the following is a specification.

We have found that complex bismuth compounds of organic acids, for instance the polyoxycarboxylic acids or nucleic acids, when combined with mercury salts form compounds which may be regarded as mercury salts of complex organic bismuth acids. These new compounds can be prepared by causing the alkali salts of complex organic bismuth acids, such as the bismuthyltartrate of potassium (s. Zeitschrift für anorganische Chemie 48,208 —1906—) or the complex bismuth salts of polyoxycarboxylic acids, which may be obtained by adding polyoxycarboxylic acids or their alkali salts to a solution of a bismuth salt containing an excess of mineral acid, and by causing the hydrolytic separation of the bismuth salt by the addition of water, combined, if necessary, with the addition of acid binding means, to react with salts of the monovalent or bivalent mercury. If the complex organic bismuth acids are capable of being mercurated, or if they contain groups which, as for instance the amino group, are capable of binding mercury in a complex manner, the possibility arises of combining mercury with complex organic bismuth acids with the effect of obtaining complex organic compounds of mercury and bismuth. Such compounds then contain bismuth as well as mercury in a modified form—i. e. these compounds do not give reactions of mercury or bismuth with sodium hydroxide.

The preparations in question may be used in the treatment of syphilis. Their toxicity is less than that of the compounds which are free from bismuth but with the same proportion of mercury; on the other hand, the tests on animals shows that the therapeutical efficiency of the bismuth is increased by the mercury component.

The following examples illustrate our invention:

1. 10 gr. of bismuthyl tartrate of sodium are dissolved in 500 c. cm. of water and run into a solution, slightly acidified with nitric acid of 6.5 gr. of mercuric nitrate in 150 c. cm. of water. A white, gelatinous precipitate results which, after being washed and dried, forms a heavy white powder containing about 40 per cent of bismuth and 34 per cent of mercury.

2. 4.1 gr. of basic bismuth gallate are dissolved in 15 c. cm. of water and 10 c. cm. of double normal caustic soda solution and combined with a solution of 2.7 gr. of mercuric chloride in 50 c. cm. of water. By pouring the clear solution into alcohol a brownish-red precipitate forms which, after being dried, contains 31.8 per cent of mercury and 31.7 per cent of bismuth. The substance thus obtained is soluble in caustic soda solution, and consequently it contains the bismuth as well as the mercury in modified form.

3. 5 gr. of bismuthylnucleic acid are dissolved in 150 c. cm. of water and in such a quantity of double normal caustic soda solution that a neutral solution results which is then mixed with a solution of 0.9 gr. of mercuric chloride in 50 c. cm. of water. By pouring the clear solution into alcohol the new compound is precipitated therefrom in the form of a white precipitate. Bismuth and mercury are also here in a modified form.

Having now described our invention, what we claim is:

1. The process of preparing mercury salts of complex organic bismuth acids, which consists in combining solutions of the alkali salts of complex organic bismuth acids with mercury salts.

2. As new products, the mercury salts of complex organic bismuth acids, obtainable by the action of mercury salts upon solutions of the alkali salts of complex organic bismuth acids, the new products being therapeutically efficient in the treatment of syphilis and less toxic than the compounds which are free from bismuth containing the same proportion of mercury, and in which the therapeutical action of the bismuth is increased by the mercury component.

In testimony whereof, we affix our signatures.

WILHELM KOLLE.
HUGO BAUER.
ERNST MASCHMANN.

Witnesses:
BASIL E. SAVARD,
C. C. L. B. WYLES.